United States Patent [19]

Shirakura

[11] Patent Number: 4,558,566
[45] Date of Patent: Dec. 17, 1985

[54] APPARATUS FOR CONTROLLING EXHAUST SYSTEM OF INTERNAL-COMBUSTION ENGINE

[75] Inventor: Masaru Shirakura, Musashino, Japan

[73] Assignee: Honda Giken Kogyo Kabushiki Kaisha, Tokyo, Japan

[21] Appl. No.: 505,240

[22] Filed: Jun. 17, 1983

[30] Foreign Application Priority Data

Jun. 22, 1982 [JP] Japan .................. 57-107318

[51] Int. Cl.$^4$ ............................. F02B 27/02
[52] U.S. Cl. ......................... 60/314; 60/312
[58] Field of Search .......................... 60/312, 314, 313

[56] References Cited

U.S. PATENT DOCUMENTS 3,254,484 6/1966 Kopper .................. 60/314
3,367,311 2/1968 Tenney .................. 60/314

FOREIGN PATENT DOCUMENTS 1601350 11/1970 Fed. Rep. of Germany ........ 60/312
112823 9/1980 Japan .................. 60/312

Primary Examiner—Douglas Hart
Attorney, Agent, or Firm—Lyon & Lyon

[57] ABSTRACT

An apparatus for controlling an exhaust system of an internal-combustion engine includes a resonance chamber having its terminating end closed and communicating with an intermediate portion of an exhaust passage of the engine, and a stop valve provided at the inlet of the resonance chamber for opening or closing the inlet in a predetermined operation region of the engine. The stop valve is actuated to effect its opening/closing operation in accordance with a predetermined operation region of the engine by means of a governor mechanism actuated in response to the rotation of a crankshaft of the engine. Through the opening/closing control effected by the stop valve, the natural frequency of the exhaust system is controlled in accordance with the operating conditions of the engine, thereby allowing the intake efficiency of the engine to be raised over a wide operation range, from low speed to high speed. Accordingly, a high output is maintained at all times.

10 Claims, 21 Drawing Figures

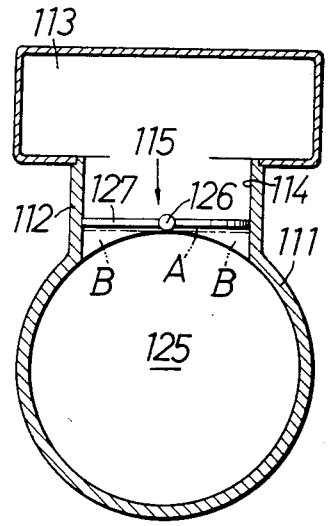
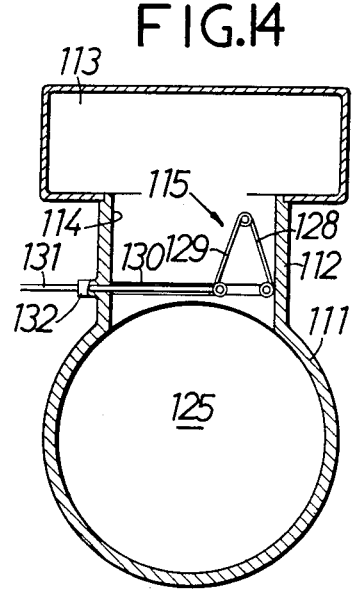
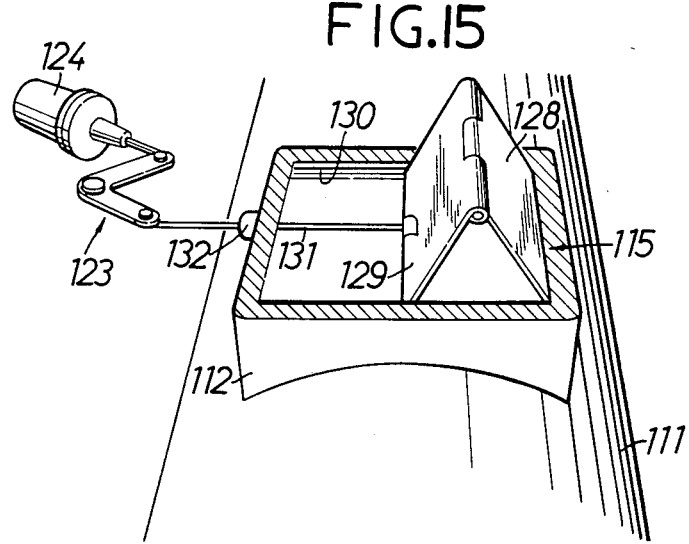

APPARATUS FOR CONTROLLING EXHAUST SYSTEM OF INTERNAL-COMBUSTION ENGINE

BACKGROUND OF THE INVENTION

1. Field of the Invention

The present invention relates to an apparatus for controlling an exhaust system of an internal-combustion engine which is adapted to control the natural frequency of the exhaust system in accordance with the operating conditions of the engine in order to raise the intake efficiency thereof over a wide operation range, from low speed to high speed, thereby allowing a high output to be offered at all times.

2. Description of the Prior Art

Hitherto, a typical internal-combustion engine contrives to increase the output by such a method that the air-fuel mixture emerging into the exhaust pipe is pushed back into the cylinder by applying to the exhaust port portion a positive pressure of pulsating waves of the combustion gas reflected from the opening of the exhaust pipe in the end of the exhaust stroke in the high-speed operation. However, the speeds of the engine at which the output can be increased are limited to the high-speed operation region in the case where the shape and dimensions of the exhaust pipe are set for the high-speed operation region, so that when the engine is operating at low speed a negative pressure of the pulsating waves acts on the exhaust port portion to suck the air-fuel mixture, resulting in a reduction of output.

Therefore, such a method is considered to improve the output performance of the engine as follows. Namely, a resonance chamber with its terminating end closed is communicated with an intermediate portion of the exhaust passage of an internal-combustion engine and is provided at its inlet with a stop valve the opening/closing operation of which is controlled by a controller. By making the resonance chamber operative through the opening operation of the stop valve, the natural frequency of the exhaust passage is lowered as if the exhaust passage were elongated, thereby allowing the pulsating effect in the exhaust passage to fit to the low- and intermediate-speed operation regions of the engine. On the other hand, by making the resonance chamber inoperative through the closing operation of the stop valve, the natural frequency of the exhaust passage is raised as if the exhaust passage were reduced in length, thereby allowing the pulsating effect in the exhaust passage to fit with the high-speed operation region of the engine. Thus, the pulsating effect of the exhaust passage is efficiently utilized over all the operation regions to raise the charging efficiency of the engine, thereby contriving improvement in its output performance.

In general, however, it is not easy to control the stop valve so as to effect its opening/closing operation in accordance with a predetermined operation region of the engine, and the apparatus for effecting such control usually becomes complicated and high in cost.

SUMMARY OF THE INVENTION

According to the invention, there is provided an apparatus for controlling an exhaust system of an internal-combustion engine having a resonance chamber, with its terminating end closed, communicating with an intermediate portion of an exhaust passage of the engine, and a stop valve provided at the inlet of the resonance chamber for opening or closing the inlet in a predetermined operation region of the engine, wherein the stop valve is actuated to effect its opening/closing operation in accordance with a predetermined operation region of the engine by means of a governor mechanism actuated in response to the rotation of a crankshaft of the engine.

A primary object of the invention is to provide an apparatus for controlling an exhaust system of an internal-combustion engine capable of accurately as well as reliably controlling the opening/closing operation of the stop valve in accordance with a predetermined operation region of the engine by effecting the control of the stop valve which opens or closes the inlet portion of a resonance chamber, with its terminating end closed, communicated with an intermediate portion of an exhaust passage of the engine, by means of a governor mechanism actuated in response to the rotation of a crankshaft of the engine.

Another object of the invention is to provide an apparatus for controlling an exhaust system of an internal-combustion engine capable of controlling the opening/closing operation of the above-mentioned stop valve with a simple construction and at a low cost without largely modifying an ordinary internal combustion engine and without requiring a special power source for the controlling apparatus.

Still another object of the invention is to provide an apparatus for controlling an exhaust system of an internal-combustion engine having no possibility of prevention of the improvement in output performance of the engine in its high-speed operation.

Further objects and detailed technical effects and advantages of the invention will be more apparent from the following description taken in connection with the accompanying drawings.

BRIEF DESCRIPTION OF THE DRAWINGS

FIG. 13 is a sectional view of an exhaust system in case of employing a single valve body having a pivot shaft in its central part;

FIG. 14 is a sectional view of a part of a still further embodiment of the invention, particularly showing a stop valve portion thereof;

FIG. 15 is a partly-sectioned perspective view of the stop valve portion in the embodiment shown in FIG. 14;

DESCRIPTION OF THE PREFERRED EMBODIMENTS

Figure 1:
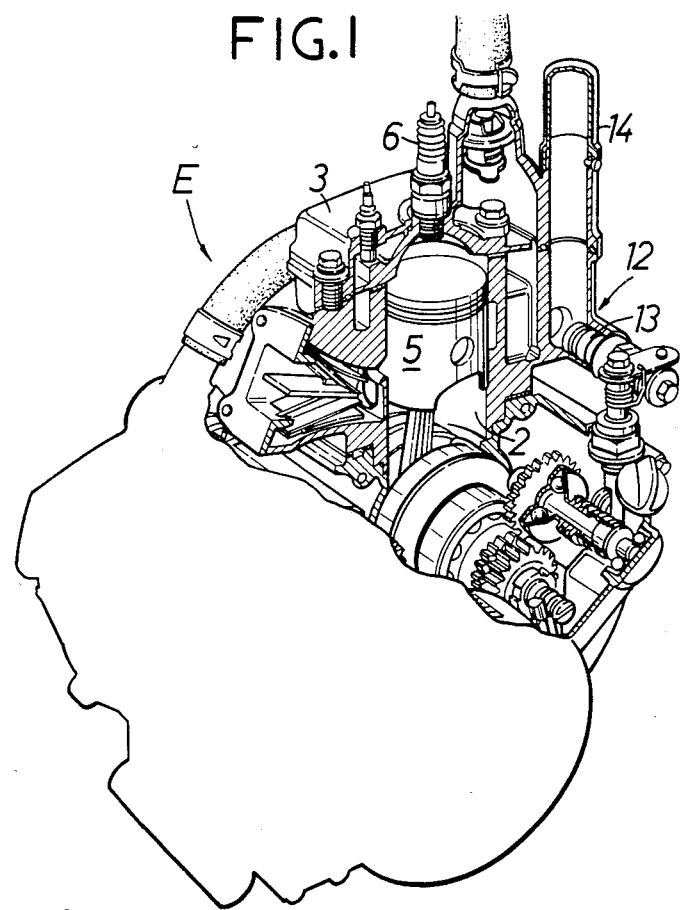
FIG. 1 is a perspective view of an internal-combustion engine in accordance with an embodiment of the invention, showing an essential part thereof in section.
Figure 2:
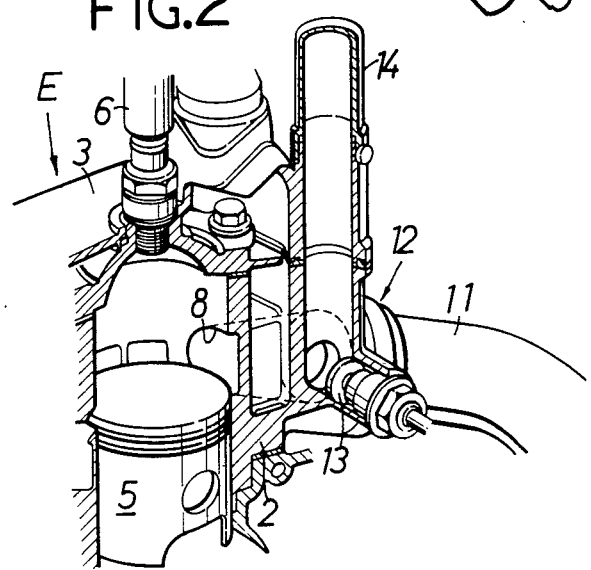
FIG. 2 is a partly-sectioned enlarged perspective view of an essential part of the internal-combustion engine shown in FIG. 1.

Referring to FIGS. 1 to 6, a two-cycle internal-combustion engine E has, as usual, a crankcase 1, a cylinder block 2 and a cylinder head 3. The crankcase 1 carries a crankshaft 4, the cylinder block 2 has a piston 5 slidably received by its cylinder bore, and the cylinder head 3 has an ignition plug 6 screwed thereto. In addition, the cylinder block 2 is provided with a suction port 7, an exhaust port 8 and a scavenging port 9 opened and closed by the ascending and descending movement of the piston 5 (see FIG. 4). The exhaust port 8 is connected with an exhaust pipe 11 having a muffler 10 provided on its intermediate portion. The exhaust port 8 and the exhaust pipe 11 constitute an exhaust passage 12. A resonance chamber 14 is connected to an intermediate portion of the exhaust passage 12, i.e., to the exhaust port 8 in the illustrated embodiment. The chamber 14 is provided at its inlet with a stop valve 13 for opening and closing the same.

The constructions of the resonance chamber 14 and the stop valve 13 will be described hereinunder with reference to FIG. 6. The inlet portion of the resonance chamber 14 is formed into a cylindrical valve chest 14a opened into the exhaust port 8. A valve seat 15 is provided on one end of the valve chest 14a as close to the exhaust port 8 as possible, and a bearing 16 is provided on the other end. The other essential portion 14b of the resonance chamber 14 is opened into the valve chest 14a between the valve seat 15 and the bearing 16.

As the stop valve 13, a poppet valve is employed having its valve rod 13 slidably carried by the bearing 16, and its valve head 13b adapted to slide inside the cylindrical valve chest 14a, between the closing position where the valve head 13b is seated on the valve seat 15 and the opening position where the valve head 13b is separate from the valve seat 15 and close to the bearing 16. The bearing 16 is provided with a grease reservoir 17 for lubricating the slide surface of the valve rod 13a and has a seal member 18 fitted on its inner end portion for preventing the exhaust gas from entering the bearing 16.

It is to be noted that although the valve seat 15 is conical in the illustrated embodiment, the valve seat 15 may be a cylinder which fits to the outer peripheal surface of the valve head 13b of the poppet valve 13.

The essential portion 14b of the resonance chamber 14 is constituted by a through hole 52 continuously bored in both the cylinder block 2 and an elongated block 51 laid on and connected to the cylinder block 2 through a seal member 50, and a cup body 54 fitted and secured to the upper end of the elongated block 51 by means of a screw 53.

The poppet valve 13 is adapted to effect its opening operation in the low- and intermediate-speed operation regions of the engine E and effect its closing operation in the high-speed operation region, and is provided with a controller C for effecting such opening/closing operations thereof as follows.

Figure 4:
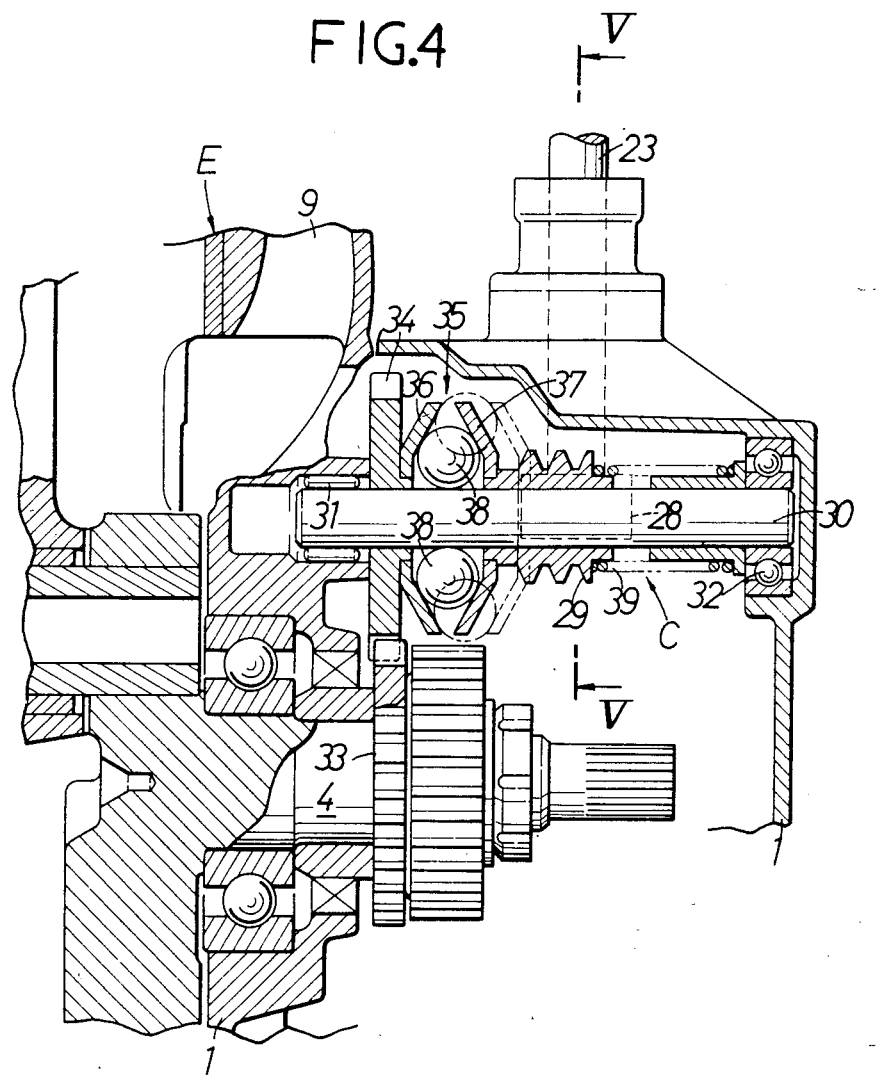
FIG. 4 is an enlarged sectional front elevational view of an essential part of the internal-combustion engine shown in FIG. 1.
Figure 5:
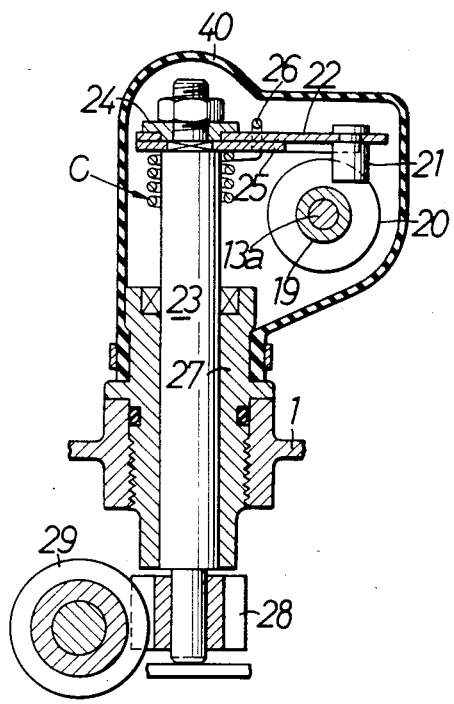
FIG. 5 is a sectional view taken along the line V—V of FIG. 4.
Figure 6:
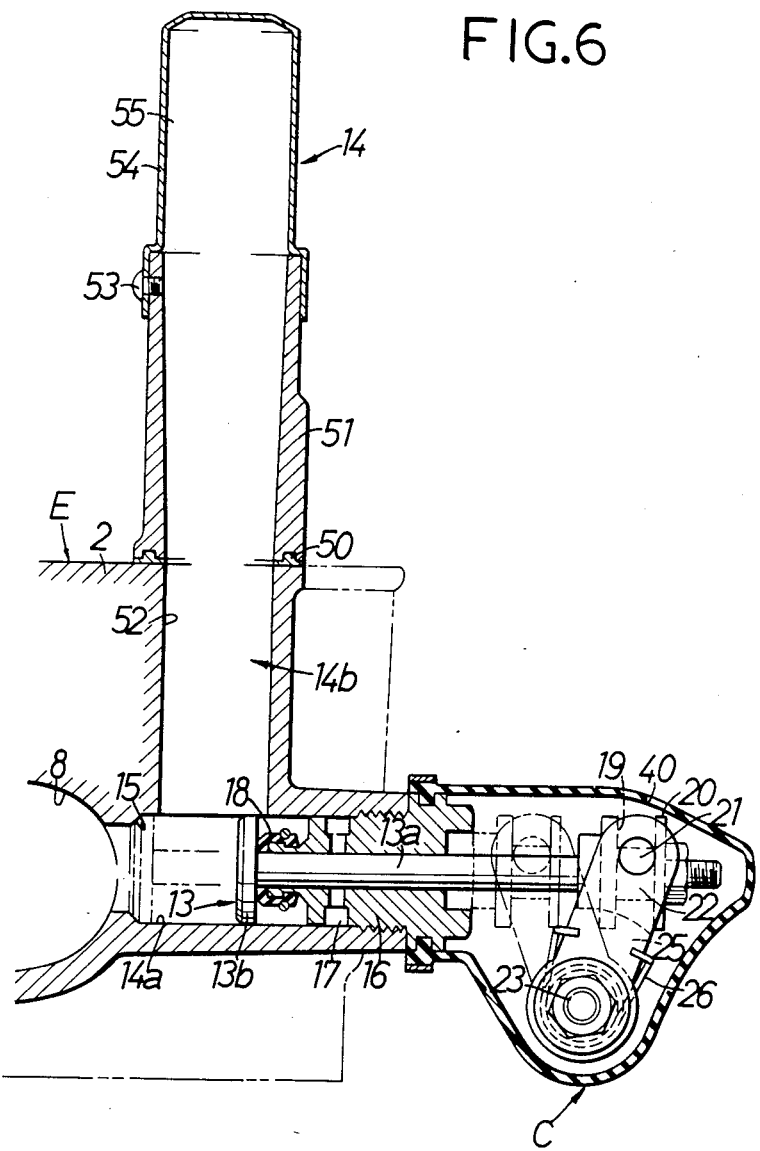
FIG. 6 is an enlarged longitudinal sectional view of an essential part of the internal-combustion engine shown in FIG. 1.

In FIGS. 4 to 6, a connecting member 20 having an annular engaging groove 19 is secured to the top of the valve rod 13a outwardly projecting from the bearing 16. A shift lever 22 having at its end a pin 21 engaging with the engaging groove 19 is rotatably attached through a bush 24 to a pivot shaft 23 disposed so that its axis is perpendicular to the axis of the valve rod 13a. In addition, the pivot shaft 23 has a driving lever 25 secured thereto adjacently to the shift lever 22. The driving lever 25 and the shift lever 22 are interconnected by means of a pinching spring 26 which pinches the levers 25 and 22 from both sides in the pivoting directions thereof. The pivot shaft 23 is rotatably carried by a bearing 27 provided on a side wall of the crankcase 1 and further has a pinion 28 secured to a portion thereof within the crankcase 1. A tubular rack 29 meshing with the pinion 28 is slidably as well as rotatably fitted on a governor shaft 30. The governor shaft 30 has both ends thereof carried by the crankcase 1 through bearings 31, 32 and is adapted to be driven by the crankshaft 4 through gears 33, 34. The governor shaft 30 is provided with a centrifugal governor 35 which moves the rack 29 rightwardly as viewed in FIG. 4 in accordance with a rise in number of revolutions of the governor shaft 30. The centrifugal governor 35 comprises a dish-like driving member 36, a dish-like driven member 37 secured to the rack 29 so as to face the dish-like driving member 36, a plurality of spherical centrifugal weights 38 annularly arranged between the dish-like members 36, 37, and a governor spring 39 adapted to set the operating timing of the centrifugal governor 35 in a predetermined high-speed operation region of the engine E. The resilient force of the spring 39 presses the rack 29 leftwardly as viewed in FIG. 4 so as to urge the dish-like driven member 37 toward the dish-like driving member 36. It is to be noted that a reference numeral 40 in FIG. 6 denotes a flexible boot which covers the controller C so that it is protected from dust, rainwater and the like.

The operation of this embodiment will be described hereinunder. During the operation of the engine E, the crankshaft 4 rotates the governor shaft 30 and the dish-like driving member 36 through the gears 33, 34, and moreover, the dish-like driving member 36 rotates the centrifugal weights 38. Therefore, through their centrifugal actions, the centrifugal weights 38 apply to the dish-like driven member 37 a thrust in such a direction that the dish-like driven member 37 is separated from the dish-like driving member 36. However, unless the engine E reaches a predetermined high-speed operation region, the thrust cannot overcome the set load of the governor spring 39; hence, the centrifugal weights 38 will not move from their inner positions shown by solid lines in FIG. 4, so that the rack 29 is held at the leftward position. Under this state, the shift lever 22 is at the rightward position as shown by a solid line in FIG. 6 and holds the poppet valve 13 at its opening position, thereby allowing the resonance chamber 14 to be operative, i.e., communicatable with the exhaust passage 12.

When the engine E enters a predetermined high-speed operation region, the thrust applied to the dish-like driven member 37 by the centrifugal weights 38 overcomes the set load of the governor spring 39 to move the dish-like driven member 37 and the rack 29 rightwardly as viewed in FIG. 4, thereby allowing the pinion 28 to be rotated. The rotation of the pinion 28 is transmitted to the shift lever 22 through the pivot shaft 23, the driving lever 25 and the pinching spring 26, to pivot the lever 22 leftwardly as shown by a chain line in FIG. 6, thereby moving the poppet valve 13 to its closing position to make the resonance chamber 14 inoperative. More specifically, the valve head 13b of the poppet valve 13 is seated on the valve seat 15 to close the inlet of the resonance chamber 14.

When the resonance chamber is operative, the natural frequency of the exhaust passage 12 lowers as if the length of the exhaust passage 12 were increased. Therefore, the pulsating effect in the exhaust passage 12 can be effectively utilized for improving the engine E in the charging efficiency in its low- and intermediate-speed operation regions.

On the other hand, when the resonance chamber 14 is inoperative, the natural frequency of the exhaust passage 12 rises as if the length of the exhaust passage 12 were decreased. Therefore, the pulsating effect in the exhaust passage 12 can be effectively utilized for improving the engine E in the charging efficiency in its high-speed operation region.

If the poppet valve 13 should cause sticking due to intrusion of carbon or other accident to make the shift lever 22 unable to pivot, the pivoting of the driving lever 25 can be absorbed in deformation of the pinching spring 26; hence, the operation of the controller C will not be interrupted.

It is to be noted that this embodiment is well applicable to four-cycle internal-combustion engines.

In such an exhaust system controlling apparatus as described above, if the length, volume and the like of the exhaust system when the stop valve is in the closing state are set for the low-level region of the exhaust noise while it is attempted to assure a high-output performance of the engine, then there will be cases where the exhaust noise level will not much lower or will even rise to the contrary despite the fact that the engine is in its low- or intermediate-speed operation region. This is attributable to the generation of resonance sounds or the like by the resonance chamber.

Figure 7:
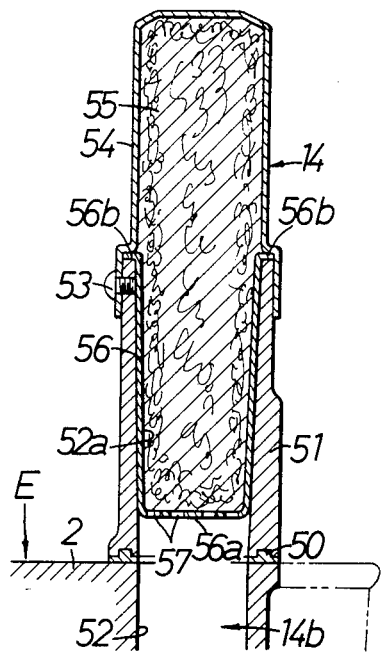
FIG. 7 is an enlarged longitudinal sectional view of an essential part of an internal-combustion engine in accordance with another embodiment of the invention.

Therefore, as a sound absorbing material, for example, a columnar glass-wool molded body 55 may be fitted, as shown in FIG. 7, into the cup body 54 and the elongated block 51 constituting the essential portion 14b of the resonance chamber 14 shown in FIG. 6.

Figure 8:
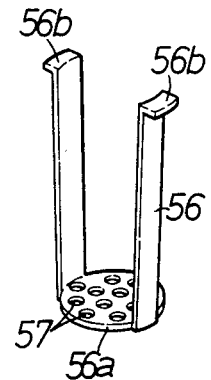
FIG. 8 is a perspective view of a hanger member in the internal-combustion engine shown in FIG. 7.

Although the glass-wool molded body 55 can be supported in any desired manner, in the illustrated embodiment, the through hole 52 in the elongated block 51 is formed into such a tapered bore 52a that a portion thereof closer to the cylinder block 2 forms a smaller-diameter end portion, and a U-shaped hanger member 56 such as shown in FIG. 8 is mounted in the tapered bore 52a so that the glass-wool molded body 55 is supported by both the hanger member 56 and the cup body 54. In this case, a multiplicity of air holes 57, 57 . . . are bored in a bottom plate 56a of the hanger member 56 so as not to interrupt the flow of the exhaust gas into the glass-wool molded body 55. In addition, upper ends of the hanger member 56 are bent to form a pair of retaining pawls 56b, 56b to be clamped between the elongated block 51 and the cup body 54. The glass-wool molded body 55 is formed so as to be large in volume density at its outer peripheral part but small in volume density at its inner part in order to retain the shape thereof and suppress the reduction in volume of the resonance chamber 14 as much as possible. Moreover, in order to assure the shape retention without damaging the sound absorbing qualities, water-glass is applied to the whole outer surface of the molded body 55 except for the lower end surface thereof supported by the bottom plate 56a and is hardened. It is to be noted that the hanger member 56 may be omitted and the glass-wool molded body 55 may be directly supported by the inner surfaces of the tapered bore 52a.

When the resonance chamber 14 is operative, any resonance sounds or the like generated by the resonance chamber 14 can be aborbed or attenuated by the glass-wool molded body 55. In particular, if the glass-wool molded body 55 is employed as a sound absorbing material as in the embodiment shown in FIG. 7, it is possible to improve the output performance of the engine as well as reduce the generated sounds, since the glass-wool molded body 55, by virtue of its properties, exhibits an excellent sound absorbing effect for sounds of high frequency but has no large influence on sounds of low frequency which participate in improvement in the output performance within the low- and intermediate-speed operation regions.

Figure 3:
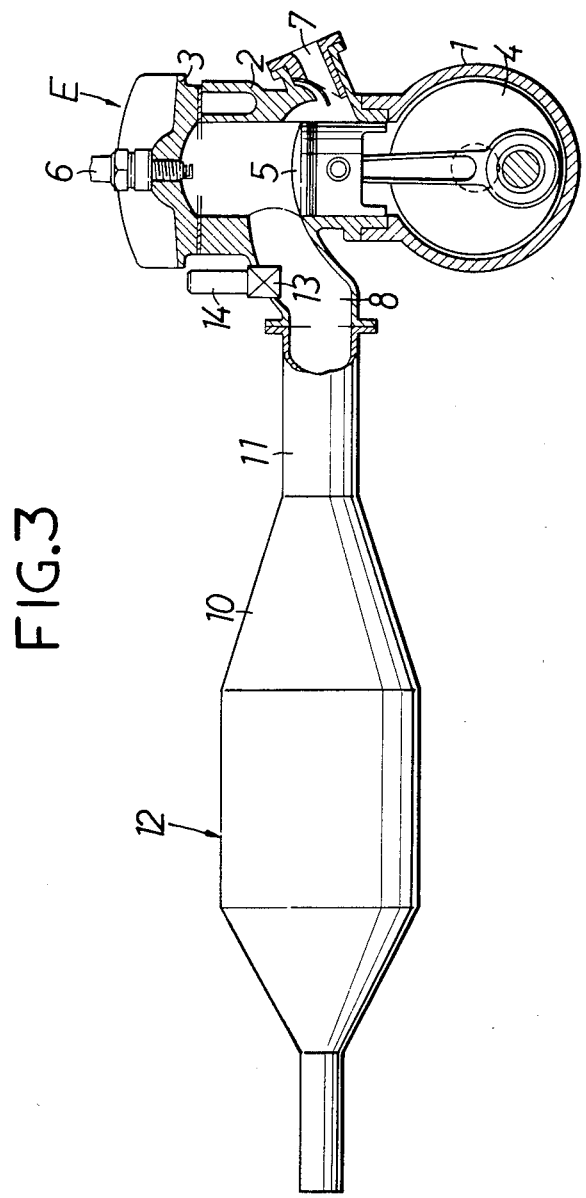
FIG. 3 is a partly-sectioned side elevational view of an essential part of the internal-combustion engine shown in FIG. 1, particularly illustrating an exhaust passage portion thereof in detail.
Figure 9:
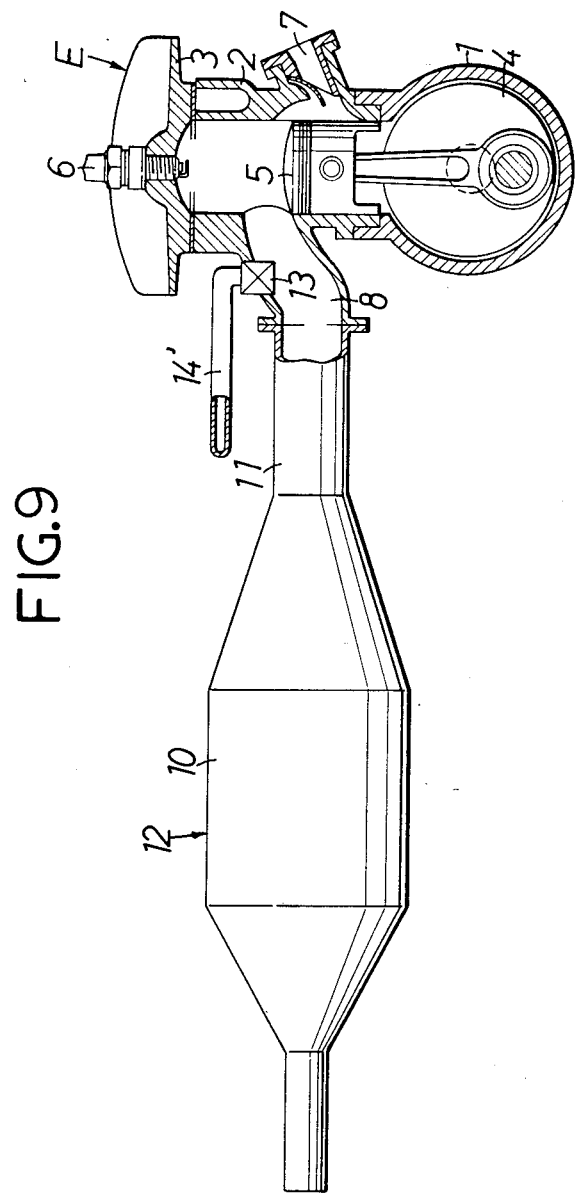
FIG. 9 is a partly-sectioned side elevational view of an essential part of an internal-combustion engine in accordance with still another embodiment of the invention.

The resonance chamber can have any desired shape besides an upright tubular shape, such as the resonance chamber 14 shown in FIGS. 1 to 7. For example, the resonance chamber may be bent at its intermediate part and extended horizontally, as in the case of a resonance chamber 14' shown in FIG. 9. In FIG. 9, the members and portions other than the resonance chamber 14' corresponding to those shown in FIG. 3 are represented by the same reference numerals as those in FIG. 3.

Figure 10:
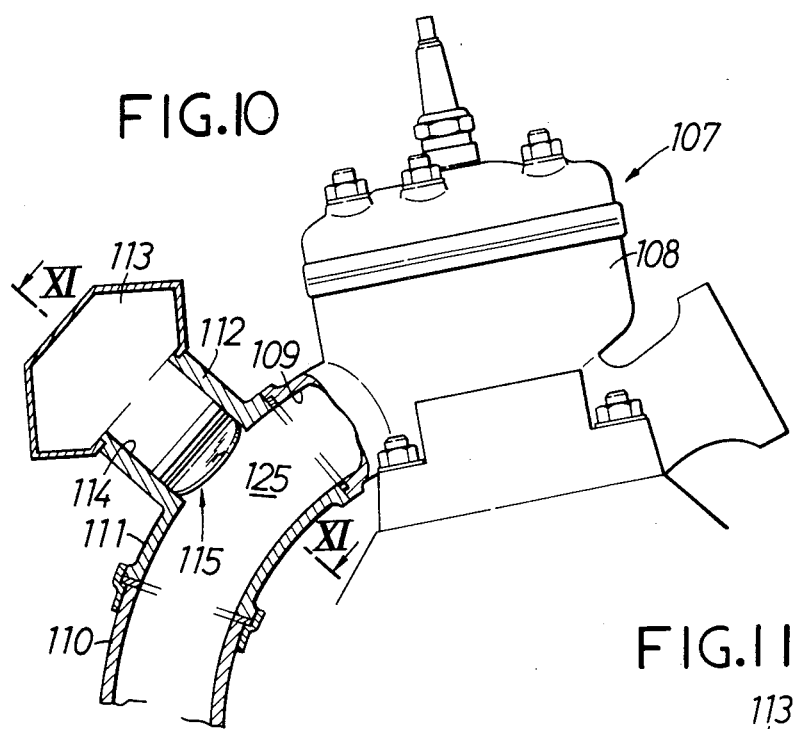
FIG. 10 is a partly-sectioned side elevational view of an essential part of an internal-combustion engine in accordance with a further embodiment of the invention.
Figure 11:
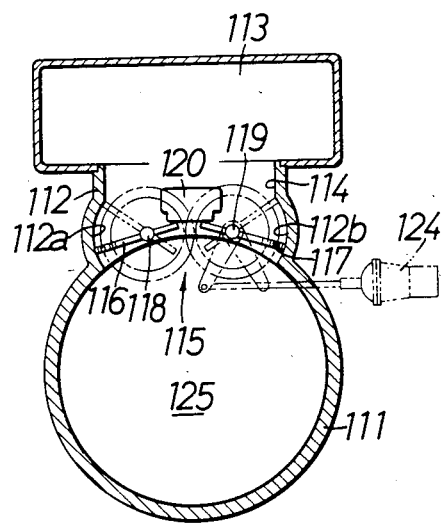
FIG. 11 is a sectional view taken along the line XI—XI of FIG. 10.
Figure 12:
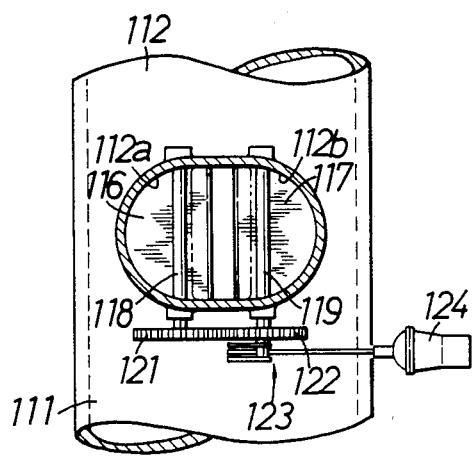
FIG. 12 is a partly-sectioned plan view showing the vicinity of a stop valve shown in FIG. 10.

FIGS. 10 to 12 in combination show an exhaust system of an internal-combustion engine in accordance with a further embodiment of the invention.

In the exhaust system of an engine 107, a connecting pipe 111 is detachably provided between an exhaust port 109 communicating with the inside of a cylinder 108 and an exhaust pipe 110, to constitute a part of an exhaust passage 125. A resonance chamber 113 is communicated with the exhaust passage 125 through a communicating passage 114 in a branch pipe 112 formed integrally with the connecting pipe 111. In addition, a stop valve 115, which is adapted to open the communicating passage 114 when the engine 107 is operating at low speed but close the communicating passage 114 when the engine is operating at high speed, is provided in the communicating passage 114 in the vicinity of the exhaust passage 125.

The stop valve 115 includes valve bodies 116, 117, split into two, for example, as will be clear from FIGS. 11 and 12 in particular. The two valve bodies 116, 117 are made close to the exhaust passage 125 by being disposed diverging downwardly as viewed in FIG. 11 so as to extend along tangents to the inner circumference of the connecting pipe 111. The valve bodies 116, 117 are formed to be pivotable about pivot shafts 118, 119 provided at portions of the respective valve bodies 116, 117 closer to the center of the communicating passage 114 than their central portions. Inner walls 112a, 112b of the branch pipe 112 are curved along the pivoting loci of the outer ends of the valve bodies 116, 117, respectively. Above the valve bodies 116, 117, a regulating member 120 is provided to be elongated along the axial direction of the pivot shafts 118, 119. The regulating member 120 is adapted to abut on the inner ends of the respective valve bodies 116, 117 thereby to regulate the pivoting of the valve bodies 116, 117 in the closing direction as well as seal the gap between the inner ends of the respective valve bodies 116, 117 when the valve is open. Two gears 121, 122 meshing with each other are secured to the end portions of the respective pivot shafts 118, 119 penetrating through the branch pipe 112, as shown in FIG. 12. When one gear 122 is rotated by an actuator 124 through a link 123, the valve bodies 116, 117 pivot in synchronism with each other thereby to open or close the communicating passage 114. The actuator 124 employs, for example, a compressed air source such as an air pump or the like which is driven by the engine 107, so that the valve bodies 116, 117 are driven in accordance with the speed of the engine 107.

By the way, as the stop valve 115, it is generally considered employing a single valve body 127 pivoting about a pivot shaft 126 provided in the central portion of the communicating passage 114 as shown in FIG. 13. If such a single valve body 127 is employed, however, the pivot shaft 126 is located at the center of the communicating passage 114, and the valve body 127 is provided along a tangent to the inner circumference of the connecting pipe 111. Consequently, when the valve body 127 is in the closing state, there are an invalid space A between the valve body 127 and the exhaust passage 125 corresponding to the thickness of the pivot shaft 126 and an invalid space B in the vicinity of the inner wall of the branch pipe 114. The existence of these invalid spaces A, B is one of factors in reduction of the output in the high-speed operation of the engine. In the invention, however, the stop valve 115 is constituted by a plurality of valve bodies 116, 117 split from each other, and these valve bodies 116, 117 are provided along tangents to the inner circumference of the connecting pipe 111 to diverge outward. Therefore, it is possible to reduce the invalid space formed between each of the valve bodies 116, 117 and the exhaust passage 125 when the valve is in the closing state. Accordingly, it becomes possible to prevent reduction of the output when the engine is operating at high speed.

FIGS. 14 and 15 in combination show a still further embodiment of the invention. In this embodiment, the stop valve 115 is constituted by, for example, two valve bodies 128, 129 split from each other and foldably connected to each other. One side of the valve body 128 is fixed to the branch pipe 112, and both end portions of one side of the valve body 129 are adapted to be linearly movable along respective guide rails 130. The intermediate portion of the one side of the valve body 129 is swingably connected to one end of a shaft 131. The other end of the shaft 131 penetrates the peripheral wall of the branch pipe 112 through a bush 132 and is connected to the actuator 124 through the link 123. According to such a construction, it becomes possible to provide the stop valve 115 close to the exhaust passage 125, as will be apparent from FIG. 14 in particular. Thereby, it is possible to reduce at least the invalid space corresponding to the invalid space A in FIG. 13; hence, the output reduction in the high-speed operation can be suppressed.

Figure 16:
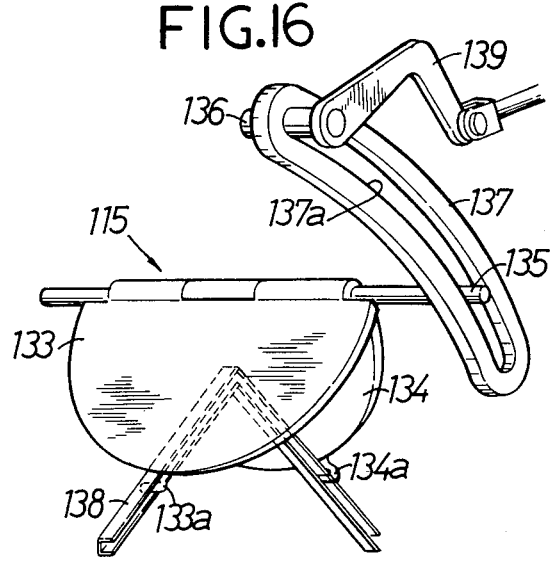
FIG. 16 is a perspective view of an essential part of a stop valve portion of a still further embodiment of the invention.
Figure 18:
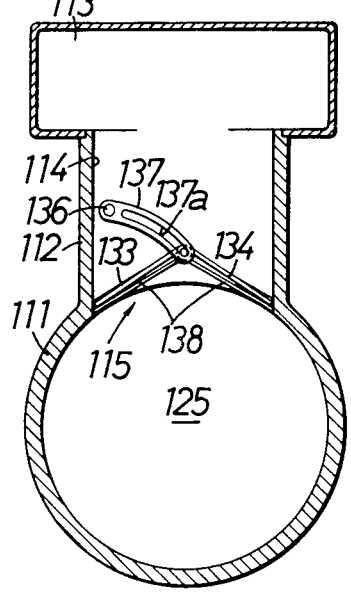
FIG. 18 is a sectional side elevational view of an essential part of the stop valve shown in FIG. 16, illustrating the closing state thereof.
Figure 17:
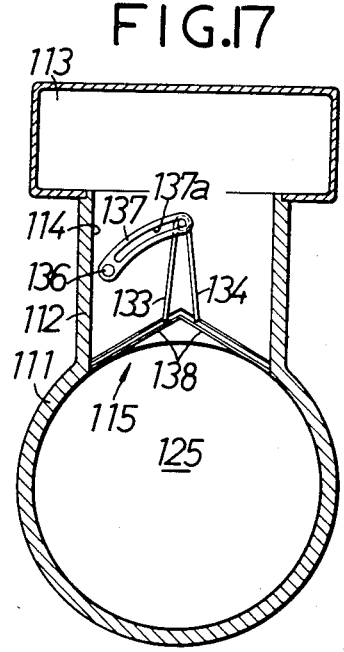
FIG. 17 is a sectional side elevational view of an essential part of the stop valve shown in FIG. 16, illustrating the opening state thereof.

FIGS. 16 to 18 in combination show a still further embodiment of the invention. This embodiment is arranged as follows. Namely, the stop valve 115 is constituted by two valve bodies 133, 134 split from each other and foldably connected to each other. A connecting shaft 135 at the connection between the valve bodies 133, 134 vertically moves along a guide bore 137a formed in a cam 137 swinging about a pivot shaft 136. Moreover, protrusions 133a, 134a formed at ends of the respective valve bodies 133, 134 move along a bent guide rail 138, thereby to open or close the communicating passage 114. The pivot shaft 136 is driven by the actuator 124 (see FIGS. 12 and 15) through a link 139. When the stop valve 115 is in the closing state, the end of the cam 137 is above the pivot shaft 136, so that the two valve bodies 133, 134 are folded, as shown in FIG. 17. When the valve is open, the end of the cam 137 is below the pivot shaft 136, so that the two valve bodies 133, 134 are bent along tangents to the inner circumference of the connecting pipe 111, as shown in FIG. 18. Accordingly, when the valve is in the closing state, it is possible to reduce the invalid space corresponding to the greater part of the invalid spaces A and B in FIG. 13; hence, the output reduction in the high-speed operation can be prevented.

Figure 19:
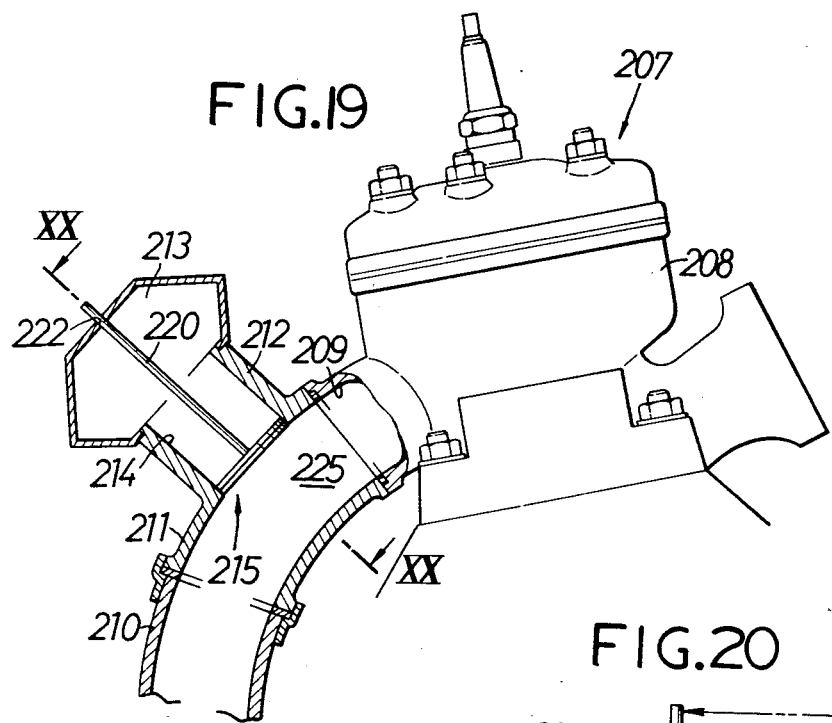
FIG. 19 is a partly sectioned side elevational view of an essential part of an internal-combustion engine in accordance with a still further embodiment of the invention.
Figure 20:
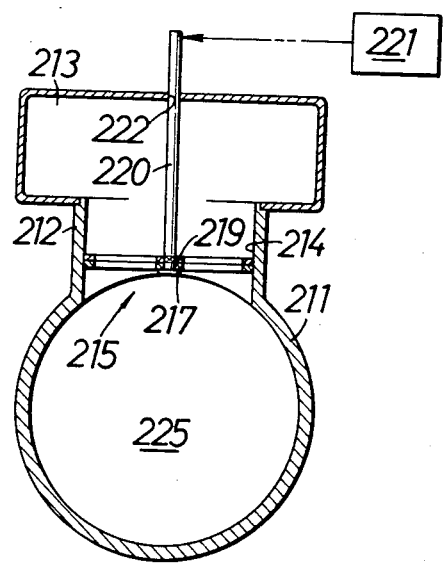
FIG. 20 is a sectional view taken along the line XX—XX of FIG. 19.
Figure 21:
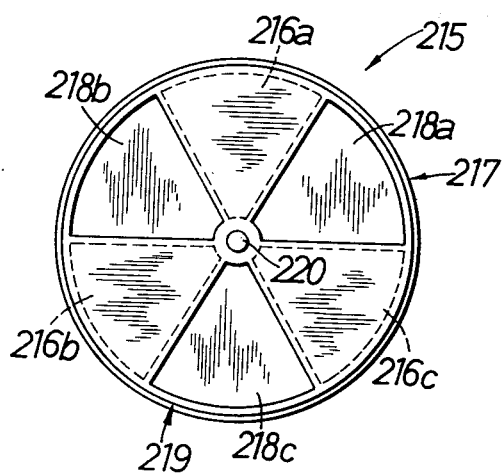
FIG. 21 is a sectional plan view of a stop valve in the embodiment shown in FIG. 19.

FIGS. 19 to 21 in combination show an exhaust system of an internal-combustion engine in accordance with a still further embodiment of the invention.

In the exhaust system of an engine 207, a connecting pipe 211 is detachably provided between an exhaust port 209 communicating with the inside of a cylinder 208 and an exhaust pipe 210, to constitute a part of an exhaust passage 225. A resonance chamber 213 is communicated with the exhaust passage 225 through a communicating passage 214 in a branch pipe 212 formed integrally with the connecting pipe 211. In addition, an opening/closing means 215 for opening the communicating passage 214 when the engine 207 is operating at low speed and for closing the communicating passage 214 when the engine 207 is operating at high speed is provided in the communicating passage 214 in the vicinity of the exhaust passage 225.

The opening/closing means 215, as will be clear from FIG. 21 in particular, includes a fixed disc 217 having, for example, three bores 216a to 216c and secured to the inner wall of the branch pipe 212, and a rotary disc 219 having three bores 218a to 218c corresponding to the bores 216a to 216c of the fixed disc 217 and rotatively sliding with respect to the fixed disc 217. FIG. 21 shows the state where the bores 216a to 216c of the fixed disc 217 and the bores 218a to 218c of the rotary disc 219 do not face each other, i.e., the state where the communicating passage 214 is closed. When the rotary disc 219 is rotated about 60° clockwise (or counterclockwise) as viewed in the Figure from the position in this closing state by a control means 221 through a shaft 220, the bores 216a to 216c of the fixed disc 217 and the bores 218a to 218c of the rotary disc 219 face each other at the rotated position, thereby allowing the communicating passage 214 to be open. As the control means 221, it is possible to employ, for example, a compressed air source such as an air pump or the like which is driven by the engine 207. Since the control means 221 is not included in the subject matter of the present invention, the description of a practical construction thereof is omitted. A seal member 222 is interposed between the resonance chamber 213 and the shaft 220 penetrating therethrough in order to maintain the airtightness of the resonance chamber 213.

In this embodiment, the inlet of the resonance chamber 213, i.e., the communicating passage 214 is opened or closed by means of the two discs 217, 219 having the bores. Therefore, it is possible to provide the fixed disc 217 close to the exhaust passage 225, so that the invalid space formed when the communicating passage 214 is closed can be reduced. Accordingly, it becomes possible to prevent the output reduction in the high-speed operation of the engine.

Although the invention has been described through specific terms, it is to be noted here that the described embodiments are not exclusive and various changes and modifications may be imparted thereto without departing from the scope of the invention which is limited solely by the appended claims.

What is claimed is:

1. In an apparatus for controlling an exhaust system of an internal combustion engine comprising a resonance chamber having its terminating end closed and communicating with an intermediate portion of an exhaust passage of the internal combustion engine, and a stop valve provided at the inlet of said resonance chamber for opening or closing said inlet in a predetermined operation region of the engine, the improvement wherein said stop valve is actuated to effect its opening/closing operation in accordance with a predetermined operation region of said engine by means of a governor mechanism actuated in response to the rotation of a crankshaft of said engine, means for transferring motion between said governor mechanism and a rotary shaft, said governor mechanism acting to control the rotation of said rotary shaft, said rotary shaft having a driving lever fixed thereto so as to be rotatable integrally with said rotary shaft, said driving lever being connected to a shift lever by means of a resilient spring member so that said driving lever is swingable relative to said shift lever, and said shift lever being adapted for opening and closing said stop valve while being supported by said rotary shaft so as to be swingable about said rotary shaft.

2. An apparatus for controlling an exhaust system of an internal combustion engine according to claim 1, wherein said governor mechanism has a centrifugal governor rotated by receiving the rotational force derived from the crankshaft of said engine, and said motion transfer means includes a rack-and-pinion mechanism for converting the axial displacement amount of said centrifugal governor into a rotational amount of said rotary shaft.

3. An apparatus for controlling an exhaust system of an internal-combustion engine according to claim 1, wherein at least a part of said resonance chamber is formed within a cylinder block or cylinder head of said engine.

4. In an apparatus for controlling an exhaust system of an internal combustion engine comprising a resonance chamber having its terminating end closed and communicating with an intermediate portion of an exhaust passage of the internal combustion engine, and a stop valve provided at the inlet of said resonance chamber for opening or closing said inlet in a predetermined operation region of the engine, the improvement wherein said stop valve is actuated to effect its opening/closing operation in accordance with a predetermined operation region of said engine by means of a governor mechanism actuated in response to the rotation of a crankshaft of said engine and the inlet portion of said resonance chamber being defined as a cylindrical valve chest opened into said exhaust passage, said valve chest including a valve seat at the end portion of said valve chest closer to said exhaust passage and a bearing at the other end portion of said valve chest, said resonance chamber being opened between said valve seat and said bearing, and wherein a poppet valve is used as said stop valve, said poppet valve including a valve head slidable within said valve chest between a closed position and an open position and a valve rod slidably supported by said bearing.

5. An apparatus for controlling an exhaust system of an internal-combustion engine according to claim 4, wherein a sound absorbing material is housed in said resonance chamber.

6. In an apparatus for controlling an exhaust system of an internal combustion engine comprising a resonance chamber having its terminating end closed and communicating with an intermediate portion of an exhaust passage of the internal combustion engine, and a stop valve provided at the inlet of said resonance chamber for opening or closing said inlet in a predetermined operation region of the engine, the improvement wherein said stop valve is actuated to effect its opening/closing operating in accordance with a predetermined operation region of said engine by means of a governor mechanism actuated in response to the rotation of a crankshaft of said engine and wherein said resonance chamber includes a glass-wool molded body for sound absorption.

7. An apparatus for controlling an exhaust system of an internal combustion engine according to claim 6, wherein said resonance chamber has an inner wall and said sound absorbing material is in contact relation with the inner wall of the resonance chamber.

8. An apparatus for controlling an exhaust system of an internal combustion engine according to claim 1, 4 or 6, wherein said resonance chamber is bent at an intermediate part thereof and is extended horizontally.

9. An apparatus for controlling an exhaust system of an internal combustion engine according to claim 1, 4 or 6, wherein each cylinder of said engine has a single exhaust passage which is continuously in a communicated state to the atmosphere irrespective of the opening/closing operations of said stop valve.

10. An apparatus for controlling an exhaust system of an internal combustion engine according to claim 1, 4 or 6, wherein said exhaust passage has a constant length.

* * * * *